United States Patent [19]

Gaber et al.

[11] Patent Number: 5,163,362
[45] Date of Patent: Nov. 17, 1992

[54] FOOD PRESS

[75] Inventors: Ira Gaber, W. Norwalk, Conn.; Cooper C. Woodring, Plandome, N.Y.

[73] Assignee: Better Mousetraps, Inc., Plandome, N.Y.

[21] Appl. No.: 763,434

[22] Filed: Sep. 20, 1991

[51] Int. Cl.⁵ .................. A47J 19/06; A47J 42/34; B30B 7/00; B30B 9/02

[52] U.S. Cl. .................. 99/495; 99/458; 100/112; 100/125; 100/234; 100/902; D7/665

[58] Field of Search ......... 99/495, 509, 510, 456, 99/458, 460, 465; 100/125, 132, 233, 234, 112, 116, 902; 241/95; D7/665, 666

[56] References Cited

U.S. PATENT DOCUMENTS

| | | |
|---|---|---|
| 3,702 | 11/1869 | Littlefield . |
| 207,974 | 9/1878 | McConnell . |
| 254,382 | 2/1882 | Rockwood . |
| D. 266,824 | 11/1982 | Harris . |
| D. 273,553 | 4/1984 | Bovet . |
| D. 288,272 | 2/1987 | Steinko . |
| D. 293,757 | 1/1988 | Pedrini . |
| D. 298,720 | 11/1988 | Bolduc et al. . |
| 427,604 | 5/1890 | McKay . |
| 531,478 | 12/1894 | Stauber ............... 100/116 |
| 643,443 | 2/1900 | Aiken . |
| 1,088,123 | 3/1914 | Browning . |
| 1,197,231 | 9/1916 | Petrik . |
| 2,046,396 | 7/1936 | Matter et al. . |
| 2,427,446 | 9/1947 | De La Roza, Sr. ......... 100/112 |
| 2,589,724 | 3/1952 | Miller . |
| 2,776,616 | 1/1957 | Sarossy . |
| 3,223,133 | 12/1965 | Brookey . |
| 3,550,775 | 12/1970 | Cooley ............... 100/112 |
| 3,580,168 | 5/1971 | Zysset . |
| 4,069,752 | 1/1978 | Ahner . |
| 4,188,875 | 2/1980 | Fabbri et al. . |
| 4,301,722 | 11/1981 | Balbo et al. ........... 100/902 |
| 4,348,950 | 9/1982 | Harris ................. 99/510 |
| 4,393,588 | 7/1983 | Kowalski ............. 30/196 |
| 4,394,834 | 7/1983 | Lowe ................. 100/902 |
| 4,466,346 | 8/1984 | Gemelli ............... 99/495 |
| 4,537,123 | 8/1985 | Holcomb ............. 99/510 |
| 4,545,299 | 10/1985 | Ahner ................. 99/495 |
| 4,582,265 | 4/1986 | Petronelli . |
| 4,590,000 | 5/1986 | Baatz et al. ........... 100/902 |
| 4,714,205 | 12/1987 | Steinko ............... 241/95 |
| 4,787,307 | 11/1988 | Rolband .............. 99/572 |
| 4,794,854 | 1/1989 | Swaim ................ 100/112 |

FOREIGN PATENT DOCUMENTS

| | | |
|---|---|---|
| 0134093 | 3/1985 | European Pat. Off. ....... 100/125 |
| 0212057 | 4/1986 | European Pat. Off. . |
| 3113515 | 11/1982 | Fed. Rep. of Germany ... 100/116 |
| 1052074 | 1/1954 | France ................. 100/234 |
| 1111677 | 3/1956 | France . |
| 429725 | 2/1948 | Italy ................... 100/234 |
| 167888 | 3/1934 | Switzerland ........... 100/125 |
| 2084862A | 4/1982 | United Kingdom . |

Primary Examiner—Timothy F. Simone
Attorney, Agent, or Firm—George P. Hoare, Jr.

[57] ABSTRACT

A food press, having an elongated body including a forward end with perforations through which pressed foodstuffs can pass, and chamber means adjacent said forward end for receiving and pressing foodstuffs. A reciprocating piston is slidably fitted within the chamber means for moving and pressing foodstuffs, wherein the piston is adapted to be positioned rearwardly of the foodstuffs in the chamber means in its retracted position and against said forward end for pressing the foodstuffs through the perforations in its forward position. The press also has a rotatable handle pivotally connected to the elongated body rearwardly of the piston, and linking means which are connected to the handle and to the piston. When the handle is rotated in one direction the piston is moved to its retracted position to allow the chamber means to receive foodstuffs. When the handle is rotated in the other direction the piston is moved to its forward position for pressing foodstuffs through the perforations. The food press provides progressively increasing mechanical advantage ratios and correspondingly progressively increasing pressure ratio through the linking of the non-constant increments of linear movement of the travel of the piston to the constant increments of arcuate travel of the handle.

24 Claims, 7 Drawing Sheets

FOOD PRESS

FIELD OF THE INVENTION

This invention relates to devices for pressing, mashing, and/or crushing foodstuffs, such as fruits, vegetables, herbs, spices, and like condiments. Pressed foodstuffs become finely divided and/or separated and may be consumed directly after pressing or may be added as an ingredient during a food preparation procedure. In particular, this invention relates to an improved garlic (allium sativum) press which can be used for kitchen, domestic and commercial purposes.

BACKGROUND OF THE INVENTION

Generally, there are two types of available food presses for pressing garlic and the like. The first, which is more common, is the lever arm type. The second is the less common screw type.

The lever arm type of press usually includes a pair of levers or arms pivotably hinged together at their forward ends. Typically, the upper arm includes a pressure plate adjacent the hinge and the lower arm includes a basket adjacent the hinge which approximately corresponds to the breadth of the plate. When the arms are rotatably separated about their hinge, the plate evacuates the basket and allows cloves of garlic or other foodstuffs to be inserted for pressing. When the arms are moved together, the plate enters the basket and contacts the cloves or the like and a squeezing force applied to the free ends of the arms will force the foodstuffs through perforations or openings in the bottom of the basket. This process produces mash, juice, pulp, and/or reduced sized pieces of the cloves or other foodstuffs.

As used herein, cloves of garlic refer to the separable segments of the garlic bulb.

Food presses of the lever type have drawbacks. Among the most important are their limited capacity and inability to fully press foodstuffs through the basket. One reason for these limitations is that the conventional presses have handles in the range of about 4 to 6 inches in length for ease or convenience of use. General experience has shown that substantially longer handles make the press cumbersome and difficult to use and store. These limitations, however, limit the mechanical advantages, which can be achieved, e.g., normally about 3 or 4 to 1. This limitation, in turn, restricts the amount of pressure which can be obtained. To accommodate this restriction, while attempting to obtain at least adequate pressing pressures of about 30 to 40 pounds per square inch, necessitates the use of relatively small plates and baskets, thereby limiting the amount of foodstuffs which can be pressed per loading. Typically, the pressure plates have a surface area of about 0.5 to 1.0 inch.

In addition, the achievable pressures are often inadequate to force all of the fibrous material through the openings in the basket when pressing foodstuffs like garlic. As a result, the fibrous material may block the final advance of the pressure plate. In subsequent cycles and between cleanings, the problem is compounded by the buildup of more and more fibrous material, further blocking the final advance of the pressure plate. Moreover, changing the scale of the press will have no effect on pressure; however, lengthening the handles while maintaining the area of the pressure plate of a conventional lever type food press will increase the mechanical advantage or pressure, but can make the press less convenient to use and store. Decreasing the area of the pressure plate while maintaining the length of the handle of a conventional lever type food press will also increase the mechanical advantage or pressure, but will reduce the capacity, making the press less convenient.

Some available lever type presses have other drawbacks. In some presses, the pressure plates are rigidly attached to the rotatable upper arm, and the baskets are rigidly attached to the rotatable lower arm. In rotating, the plate travels through an arc, relative to the basket. This arcuate or non-linear path of movement requires excessive clearances between the edges of the plate and the walls of the basket. This excessive clearance results in "blowing back" a substantial portion of the foodstuffs past the edges of the loosely fitting pressure plate instead of being forced through the perforations.

The inability to adequately clean some available garlic presses, moreover, may result in the press becoming, at best, undesirable, and, at worst, a health problem.

Thus, lever type presses are limited in capacity and may produce inadequate pressures. Some presses also may have blow back and cleanliness problems.

Screw type presses generally include hollow vertical cylindrical vessels that have a closed bottom end with perforated openings, a cylindrically formed lid with a threaded drive shaft in axial alignment, a flat pressure or contact plate of substantially the same interior vessel diameter that is operatively connected to the shaft inside the device, and a rotatable drive wheel or crank-handle attached to the shaft outside the device. The screw type press must have the shaft and plate in an elevated position and be at least partially disassembled to allow the insertion of cloves between the contact plate and the perforated openings, then re-assembled for use. The handle is rotated about its axis to force the pressure plate to contact the cloves and press them through the openings in the base. This type of screw press produces essentially the same mash, juice, pulp, and/or reduced sized pieces of the cloves of foodstuffs that are produced by a lever press.

Like the lever type press, conventional screw type presses have drawbacks. In a screw type press, more force may be required than in a lever type press, because the mechanical advantage, in this instance, is a factor of the diameter of the drive wheel or crank-handle, the distance of travel of the pressure plate caused by the threads on the drive shaft and the area of the pressure plate. Also, the pressures in a screw type press are constant and often inadequate to force all of the fibrous material through the openings when pressing foodstuffs like garlic. As in lever type presses, the fibrous material can block the final advance of the screw type pressure plate and problems can be compounded in subsequent cycles and between cleanings.

Also, in the large screw type presses, the vessel acts as both a storage means and a press. To provide the desired amount of juice, etc., on an as-needed basis, all of the foodstuffs in the larger vessel are compressed and only the needed amount is extracted. By such action, however, nature's preservation of the virgin foodstuffs (e.g., garlic cloves) is adversely affected and the freshness of the stored compressed foodstuffs may be diminished upon the next pressing.

In addition, screw type presses need to be disassembled for cleaning between cycles, which may discourage cleaning. In large vessels, the vessels may not be cleaned until all of the stored foodstuffs are pressed after repeated spaced apart cycles. Like some lever type presses, this can result in the screw type presses being undesirable and result in health problems.

Thus, there is a need for a new food press which overcomes the drawbacks of existing presses.

SUMMARY OF THE INVENTION

The presses of the present invention achieve relatively high mechanical advantage ratios and pressures in crushing foodstuffs, and include an interacting elongated base for receiving and pressing the foodstuffs, a piston linearly slidable in the base for pushing and pressing the foodstuffs through perforated openings in the base and a handle operatively connected to the base and piston for moving the piston. With the presses of the present invention, essentially constant pressure on the handle preferably produces substantially increasing piston pressures for meaningfully improving the processing of the foodstuffs. The presses of the present invention possess increased capacity for pressing virgin foodstuffs while being sized for convenient use and storage. The presses of the present invention also obviate meaningful blow back of foodstuffs during pressing and are readily cleaned.

In an embodiment of the present invention, the press preferably is hand holdable during operation and includes chamber means in the base in which foodstuffs are received and pressed, a closed front end having perforations through which the pressed foodstuffs pass and a closed peripheral wall about the chamber means adjacent the front end to prevent the escape of foodstuffs as they are being crushed and forced through the perforations. The reciprocating piston or plunger means of the press is slidably fitted in the chamber means, the handle of the press is pivotably connected to the base rearward of the piston, and a linking arm connects the handle and the piston. As the handle is rotated from its open to its closed position, the piston slides within the chamber means of the base along the longitudinal axis thereof toward the perforated end and pushes and then presses the foodstuffs in the chamber means against the perforations forcing foodstuffs through the perforations in the form of mash, juice, pulp, and the like. Preferably, the connection between the handle and the piston through the linking arm is such that as the handle moves the piston toward the perforated end for crushing, the piston moves in generally decreasing increments to thereby enable the piston to provide increased pressure when crushing the foodstuffs as it moves into contact with the front end of the press.

In a preferred embodiment of the press of the present invention, the elongated base is generally horizontal when resting on a horizontal surface or being held with its longitudinal axis in a generally horizontal direction. The base has a hollow body having a tubular wall and a closed, generally flat front end having small openings or perforations. The body includes a forward crushing chamber adjacent the perforated front end, wherein the peripheral wall thereabout is closed, and an open loading chamber adjacent the crushing chamber. The piston or plunger is slidably mounted in the body and has a breadth which is slightly smaller than the inner surface of the tubular wall, thereby providing a tight tolerance between the tubular wall of the hollow base and the periphery of the piston.

In the described preferred embodiment, the handle is rotatably attached to the other or rear end of the body, and the handle's rotatable attachment point falls on the longitudinal axis of the base. The handle has an interior cross-section similar to but larger than the exterior cross-section of the base, and the handle rotates or pivots through about a 90 degree arc ranging from being substantially perpendicular to the base in the open position to generally overlying and parallel to the base in the closed position. In this embodiment, the linking arm is pivotably attached to both the piston and to the handle.

As the handle is pivoted or rotated forward through its substantially 90 degree arc, from generally perpendicular to the base to overlying and parallel to the base, the connecting arm forces the piston to slide forward in a linear manner within the base along its longitudinal axis and through the chambers toward the perforated end of the base. In doing so, foodstuffs, such as garlic cloves, fed into the loading chamber will be pushed ahead of the piston from the open loading chamber into the externally closed crushing chamber. Additional forward rotation of the handle will continue to advance the piston and cause the foodstuffs in the closed crushing chamber to be forced against the perforated front end and out of the small openings or perforations in one end of the base.

Further, as the handle moves in equal increments in the described approximately 90° arc of rotation, the handle, via the connecting arm, moves the piston forward through the loading chamber into the crushing chamber in unequal and generally smaller increments. As a result, the force and pressure of the piston is in generally increasingly greater increments as the incremental travel of the piston generally decreases.

Thus, the presses of the present invention preferably include progressively compound mechanical advantage ratios. As the handle is moved forward in equal increments through its arcuate path, the piston is forced to move forward in shorter and unequal increments through its linear path. This causes constant pressure on the handle to result in non-constant pressure on the piston that can range from for example, 2 to 1 upwardly to 14 to 1, or more.

As a consequence, the presses of the present invention have substantially greater efficiencies which can be utilized in a number of ways. For example, the greater mechanical advantages provided by the present invention can be used to increase the capacity of the press for receiving and pressing several cloves of virgin garlic or the like on an as needed basis without reloading. This increased capacity is made possible by the progressive mechanical advantage ratios that allow the handle to remain practically short and still provide increased working pressures.

Also, the rotation of the handle and the reciprocating movement of the piston are coordinated to produce generally greater linear movement of the piston when desired. The initial stages of forward rotation of the handle effect generally greater linear movement of the piston to quickly advance the piston and therefore foodstuffs from the loading chamber into the crushing chamber. Correspondingly, after crushing the foodstuffs, the rearward rotation of the handle in its final stages produces generally greater linear movement of the piston to quickly retract the piston past the loading chamber to enable prompt reloading of the press for the next crushing operation.

In addition, the presses of the present invention obviate serious blow back of foodstuffs. As the piston or the like travels in a non-arcuate or linear path, tight tolerances are maintained between the outer periphery of the piston and the inner surface of the wall of the base. This tight tolerance prevents the foodstuffs from being blown back past the piston. As the foodstuffs are pressed, they become partially liquified. In this readily flowable state, the mash will follow the path of least resistance. Therefore the tolerance between the piston and the inner wall of the base will generally be, in total, less than the area of any one perforation. Any one perforation will therefore provide the path of least resistance for the mash to escape the crushing chamber, preventing blow back.

In addition, the presses of the present invention have improved cleaning ability, particularly of the openings or perforations in the front end of the base. This is made possible by the tight tolerances of the piston in the base. As the openings or perforations in the base provide the path of least resistance to flow, the press can be submerged in water and cycled several times, causing a pumping action of water through the openings or perforations by the piston's linear back and forth movement. This alternating pressure and vacuum pumping action will flush away any residue lodged in or directly behind the openings or perforations.

DETAILED DESCRIPTION OF A PREFERRED EMBODIMENT

Referring to the drawings and first to FIGS. 1 through 7, there is shown a hand holdable garlic press 10 of the present invention including a base 20, a piston 40 within the base 20, a handle 50 pivotally connected to the base 20 and a linking arm 60 connected to and between the piston 40 and the base 20.

The base 20 includes an elongated body 21 having a length which is substantially greater than its breadth. The body 20 preferably is cylindrical or tubular and hollow, and includes chamber means 22 for the foodstuffs and for the piston 40. In the illustrative embodiment, the body 21 has a hollow cylindrical cross section defined by the peripheral wall 32.

Figure 9:
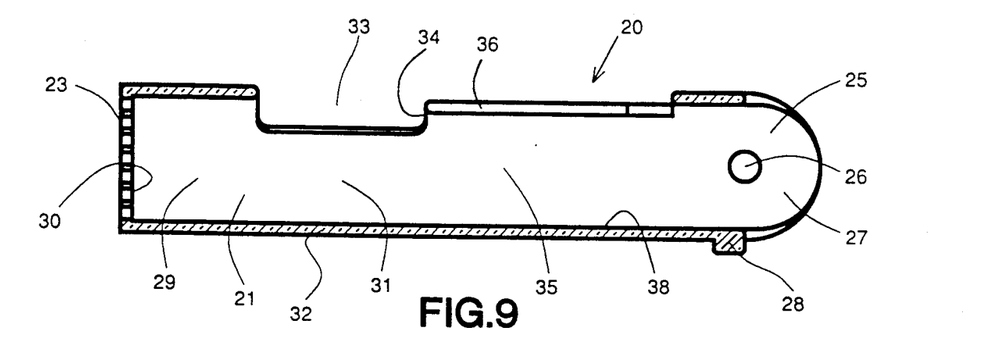
FIG. 9 is a side elevational view, partly in section, of the elongated base of the press of the present invention.
Figure 10:
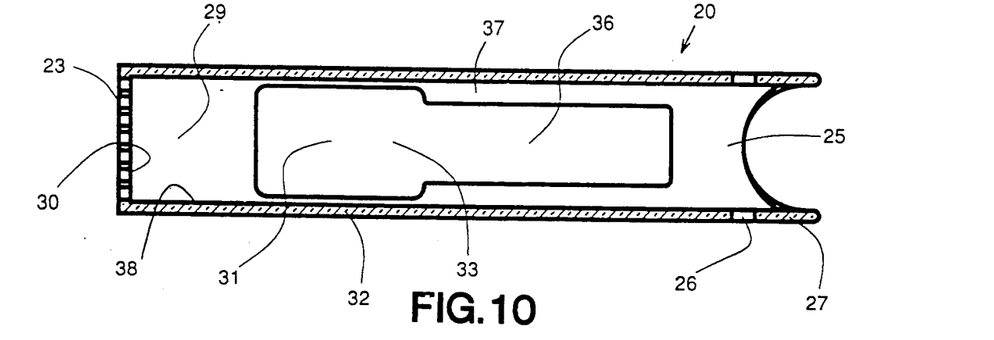
FIG. 10 is a bottom view, partly in section, of the base of FIG. 9.

The one or forward end 23 of the body 21 is closed and is flat with a plurality of perforations or openings 24 therethrough for the passage of pressed foodstuffs. The other or rear end 25 of the body 21 is open and to which the handle 50 is pivotably mounted thereto. As shown in FIGS. 9 and 10, the end 25 includes opposing bores 26 therethrough, curvilinear wings 27 and small protrusions 28 for pivotably connecting the handle 50 to the body 21. The structure of the end 25 allows the handle 50 to rotate and limits the rotation of the handle 50, as hereinafter described in more detail. In addition to acting as stops for the handle 50, the protrusions 28 can be employed to stop the entire press 10 from sliding forward during use by overhanging the protrusions 28 about the edge of a typical counter-top or the like in a kitchen.

In the illustrative embodiment, the body 21 and the handle 50 are injection molded in acrylonitrile-butadiene-styrene (ABS) plastic material.

Adjacent the closed forward end 23 and within the body 21 is a crushing chamber 29 wherein the piston 40 presses, crushes, etc. foodstuffs against the inner surface 30 of the closed forward end 23. At the crushing chamber 29, the peripheral wall 32 is closed about the chamber 29 so that foodstuffs exit through the perforations 24 and through the wall 23. Rearward of and contiguous with the crushing chamber 29 is a loading chamber 31 in the body 21.

Extending through the wall 32 of the body 21 above the chamber 31 is an opening 33 for feeding or loading foodstuffs into the loading chamber 31. In the illustrative embodiment the opening 33 is rectangular in configuration and the wall 32 includes a cut-out portion to provide a trough 34 to facilitate loading.

Rearward of and contiguous with the loading chamber 31 is a piston chamber 35 for slidably positioning the piston 40 therein prior to pushing and pressing foodstuffs through the loading chamber 31 and into the crushing chamber 29.

The body 21 also includes an opening or a slot 36 in its top 37 for receiving the linking arm 60 connected to the piston 40 and the handle 50. In the illustrative embodiment, the slot 36 extends from the loading chamber opening 33 rearwardly to accommodate the configuration and rearward movement of the arm 60.

Figure 4:
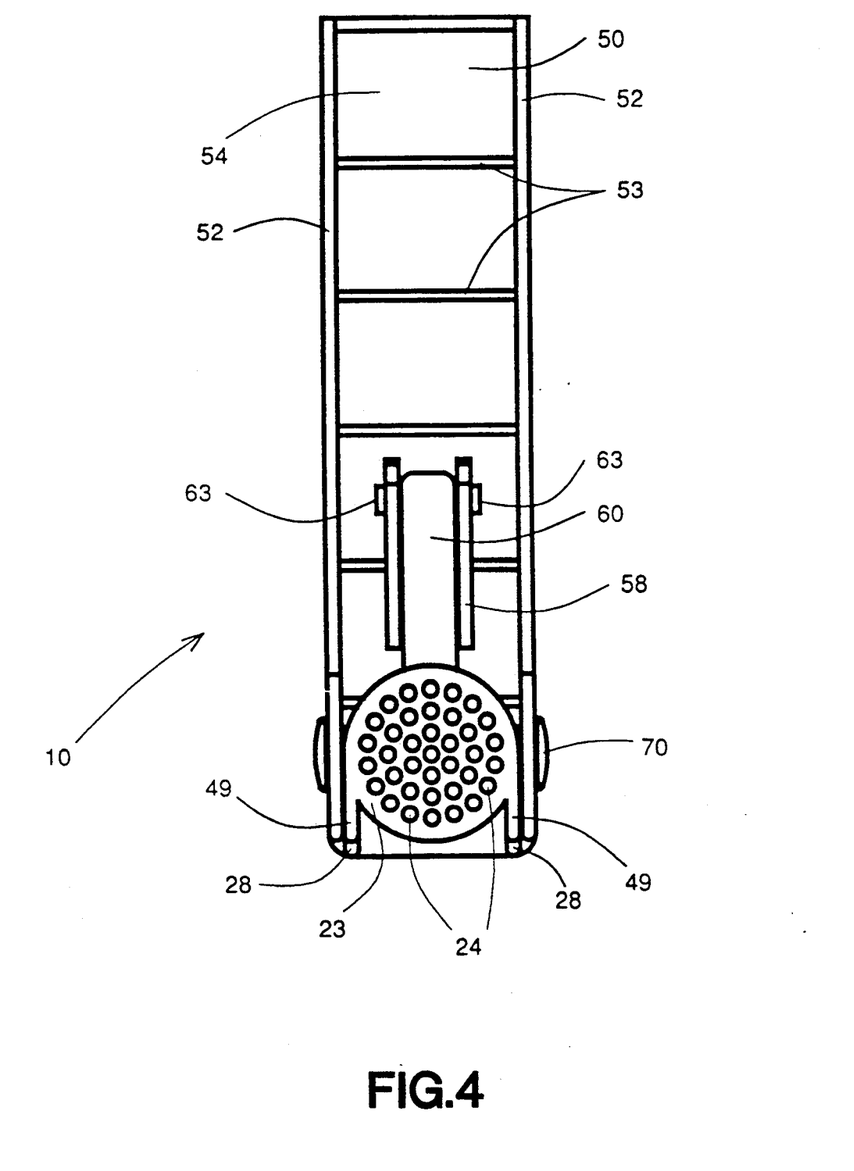
FIG. 4 is a front view of FIG. 2.
Figure 5:
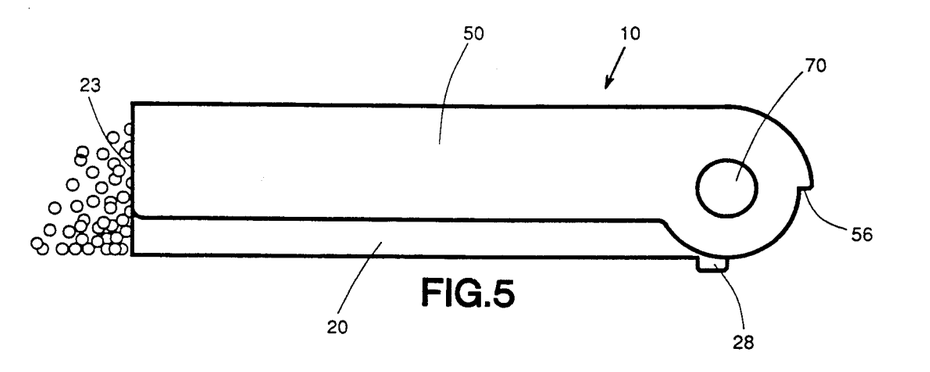
FIG. 5 is a side elevational view of the food press of FIG. 1 in the closed position showing foodstuffs exiting the press.
Figure 7:
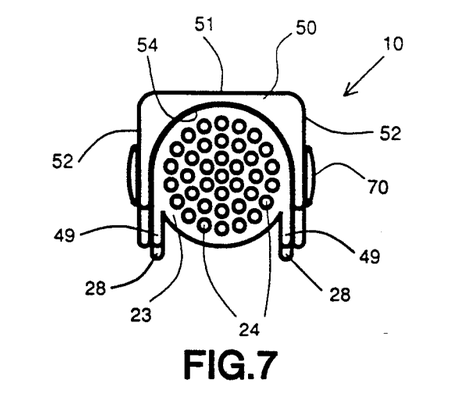
FIG. 7 is a front view of FIG. 5.

Depending from the sides of the body wall 32 are legs 49 which extend along the length of the body 21 and extend downwardly and below the body 21 (FIGS. 4 and 7). The legs 49 provide means for resting the press 10 on a surface without the rolling of the cylindrical body 21. As illustrated, the protrusions 28 extend below the legs 49 to serve as stops for the press 10 and for the rotation of the handle 50.

Figures 12, 13, 14:
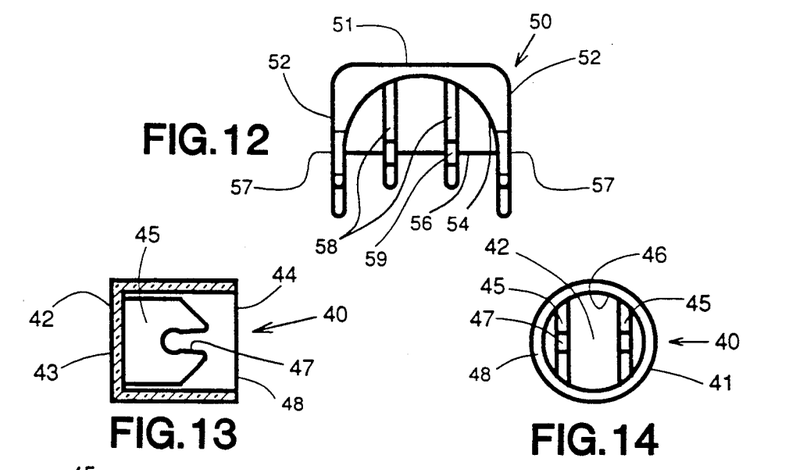
FIG. 12 is a front view of the handle.
FIG. 13 is a side elevational view, partly in section, of a piston of the present invention.
FIG. 14 is an end elevational view of the piston of FIG. 13.
Figure 15:
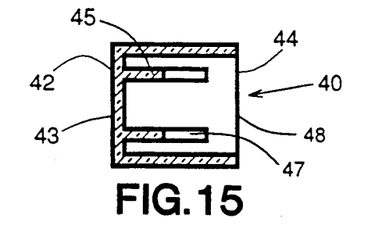
FIG. 15 is a top plan view, partly in section, of the piston of FIG. 13.

As illustrated in FIGS. 13, 14 and 15, the piston 40 is cylindrical and corresponds to the cross sectional shape of the inner surface 38 of the body 21. The piston 40 is hollow and includes a cylindrical body 41 having a breadth or diameter slightly less than the breadth or diameter of the inner surface 38 of the body 21, to thereby provide a sliding fit therebetween.

The confining wall 32 of the body 21 limits or confines the piston 40 to linear reciprocating movement as the handle 50 rotates in an arcuate manner in counter-clockwise and clockwise directions. At the same time, the space between the wall and the piston 40 is less than the area of any one perforation 24. As a result, when the piston 40 is crushing the foodstuffs, liquids and solids will flow or pass through the perforations 24 and not back about the piston 40.

Figure 2:
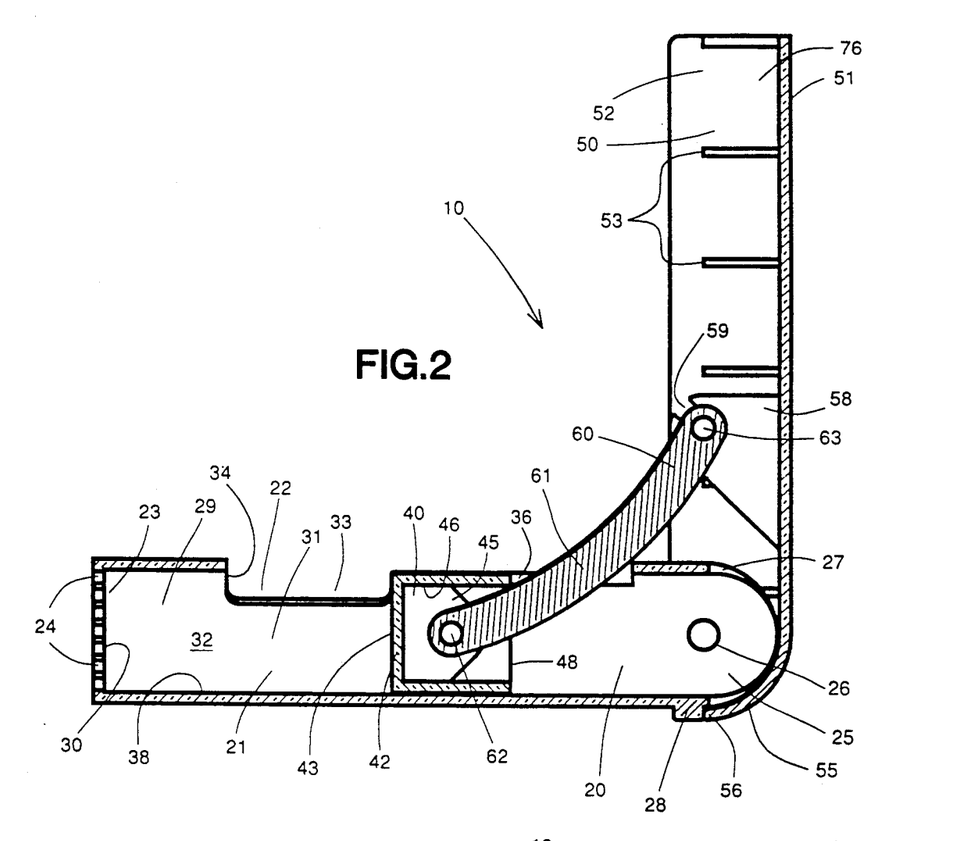
FIG. 2 is the same as FIG. 1, except that the food press is partly in section.
Figure 3:
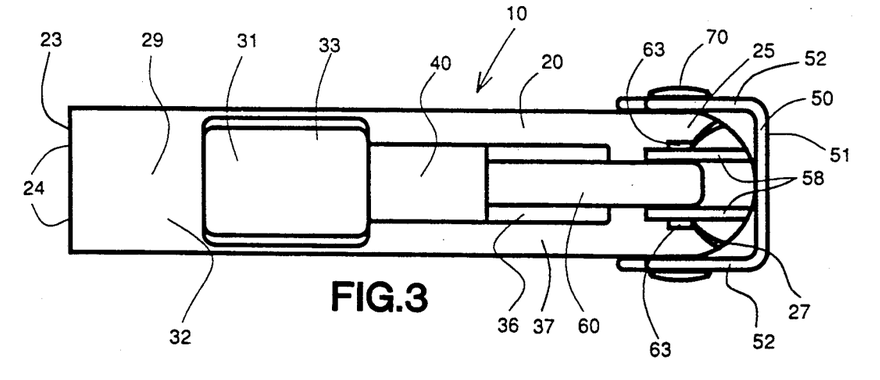
FIG. 3 is a top plan view of FIG. 2.

The piston 40 also includes a closed front wall 42 preferably having a flat frontal surface 43 which corresponds to the inner surface 30 of the flat perforated wall 23 of the body 21 shown in FIG. 2.

The piston 40 is hollow with an open rear end 44. Spanning or extending the height of the interior surface 46 of the piston 40 are a pair of struts 45 (FIGS. 13, 14 and 15) integral with the inner surface 46 of the cylindrical wall 41. The struts 45 include substantially horizontal notches 47 therein extending along the longitudinal axis of the piston 40 for connecting the piston 40 to the linking arm 60.

In the preferred embodiment, the piston 40 is injection molded and made from self lubricating plastic materials.

Figure 6:
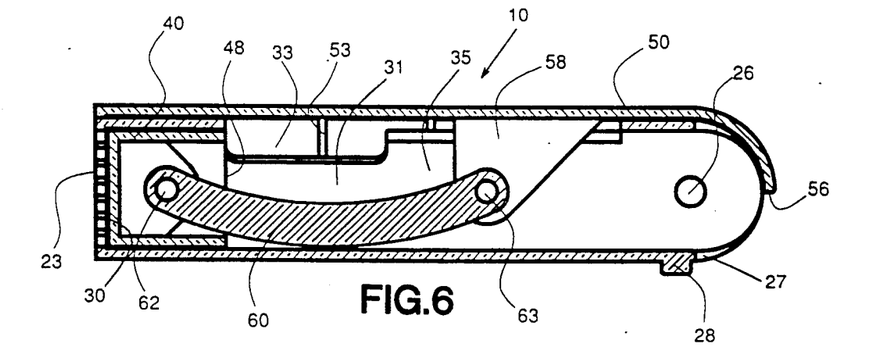
FIG. 6 is the same as FIG. 5 except that it is partly in section.
Figure 16:
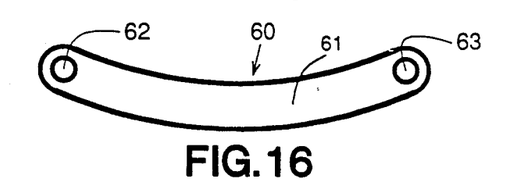
FIG. 16 is a side elevational view of a connecting arm of the present invention.
Figure 17:
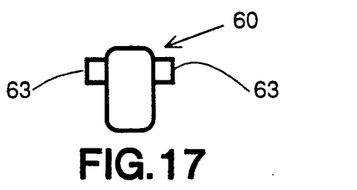
FIG. 17 is an end elevational view of the connecting arm of FIG. 16.
Figure 18:
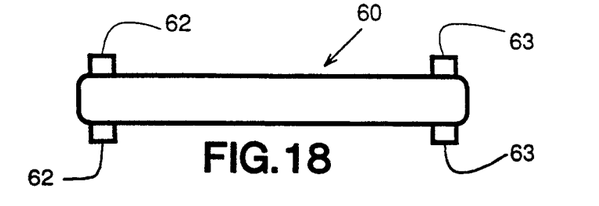
FIG. 18 is a top plan view of the connecting arm of FIG. 16.

FIGS. 16, 17 and 18 illustrate the linking or connecting arm 60 of the preferred embodiment. As shown, the linking arm 60 has an elongated body 61 of substantially greater length than breadth. Preferably the arm 60 is slightly curved along its length with a curvilinear concave configuration to allow for clearance between the arm 60 and the top wall of the piston 40 when the piston 40 is in the full rearward position shown in FIG. 2. Correspondingly, the slot 36 in the body 21 allows for the movement of the arm 60 and struts 58 into the body 21 when the piston 40 is moved to its full forward position against the interior surface 30 of the perforated flat front wall 23 (FIG. 6).

Each end of the connecting arm 60 includes a pair of tabs 62 and 63, which extend outwardly from the arm 60 in a lateral direction. The tabs 62 pivotably snap-fit into the struts 45 of the piston 40 and the tabs 63 pivotably snap-fit into the struts 58 of the handle 50, as described hereinafter.

In the preferred embodiment, the connecting arm 60 is injection molded from self lubricating plastic materials.

The handle 50 is rotatably attached to the exterior of the body 21 at the open rear end 25. The exterior of the handle 50 is rectangular, having a flat top wall 51 and depending side walls 52 (see FIGS. 7 and 12). Internally, the handle 50 includes a plurality of spaced apart lateral ribs 53 which extend across the handle 50 for providing strength. As shown in FIG. 12, the inner surface 54 of each rib 53 is curvilinear and corresponds to the cylindrical shape of the body 21 so that in its closed position the handle 50 overlies and can rest on the body 21.

The handle 50 can rotate or pivot through about a 90 degree arc from an open position substantially perpendicular to the body 21 as shown in FIG. 2 to a closed position overlying and generally parallel to the body 21 as shown in FIG. 6. The length of the handle 50 preferably is about the same as the length of the body 21.

The rear or bottom end 55 of the handle 50 includes stops 56 which cooperate with the protrusions 28 on the body 21 to limit the opening movement of the handle 50 to the substantially 90 degree arc, and a pair of bores 57 which extend therethrough for the rotatable connection of the handle 50 to the rear end 25 of the body 20. As shown in FIGS. 1, 3, 4, 5 and 7, buttons 70 serve to rotatably connect the handle 50 to the body 21 at the rear end 55 of the handle 50. Two buttons 70 are required, which fit through the bores 57 in the handle 50, and snap-fit into aligned bores 26 in the base 20. In the preferred embodiment, the buttons 70 are injection molded in a self-lubricating plastics material. The buttons 70 form, in effect, the shaft for the hinge point between the handle 50 and the base 20.

Figure 19:
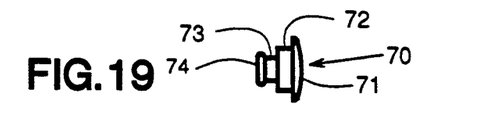
FIG. 19 is a side elevational view of a button 60 of the present invention.
Figure 20:
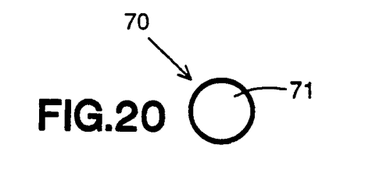
FIG. 20 is a front elevational view of the button of FIG. 19.

As illustrated in FIGS. 19 and 20, the buttons 70 each include a cap 71 which is adapted to abut the exterior of the handle 50, step-down projections 72 and 73 which extend through the bores 57 and 26, and a flange 74 for snap-fitting the buttons into place.

Figure 11:
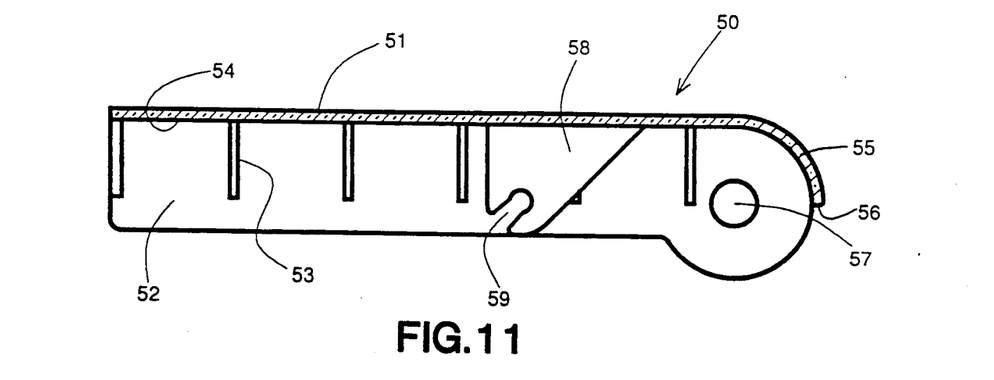
FIG. 11 is a side elevational view, partly in section, of the handle of the present invention.

As shown in FIGS. 11–12, within the handle 50, intermediate its ends are a pair of struts 58 which extend from the interior of top wall 51 to the bottom open portion of the handle 50. Each strut 58 includes a notch 59 therein at the open portion of the handle 50. As shown in FIG. 2, each notch 59 extends obliquely downwardly when the handle 50 is opened and each notch 59 is adapted to receive a tab 63 which snap-fits into a notch 59 for pivotally connecting the arm 60 to the handle 50.

The linking arm 60 is symmetrical about its vertical axis so that the described snap-fit installation of the arm 60 to the piston 40 and handle 50 can be horizontally reversed to facilitate ease of assembly.

The components of the press 10 preferably snap-fit together without the need of tools for assembly and without the need for metallic parts which can rust or corrode.

Figure 1:
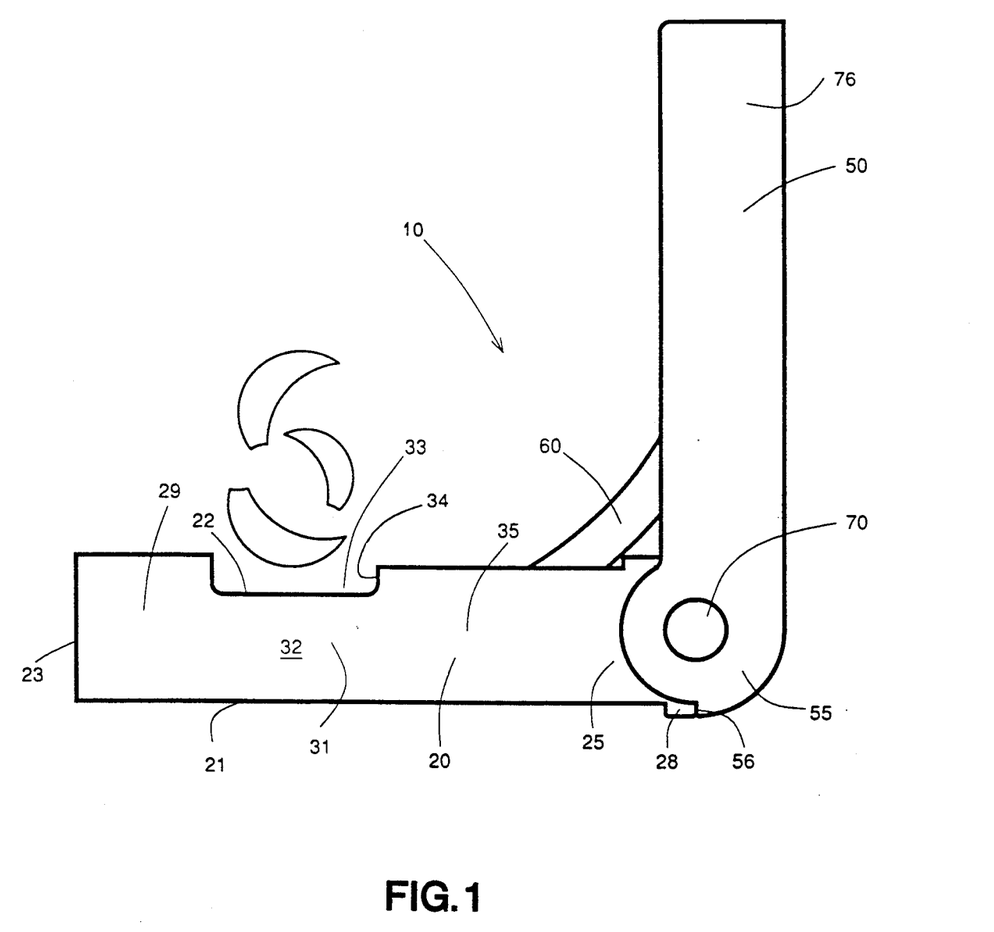
FIG. 1 is a side elevational view of a food press of the present invention shown in the open position ready to receive cloves of garlic.

In operation, FIGS. 1 and 2 show the press 10 in its open position ready for the insertion of garlic cloves or other foodstuffs into the loading chamber 31 and in front of the piston 40. As the handle 50 is rotatably advanced forward by moving its upper free end 76, the connecting arm 60 is also caused to move forward, in turn, causing the piston 40 to slide forward in the body 21 and contact the foodstuffs in the loading chamber 31. As the piston 40 slides forward in its linear path, the foodstuffs are advanced, moving from the loading chamber 31 into the crushing chamber 29, until the foodstuffs are compressed between the piston 40 and the inner surface 30 of the perforated wall 23 of the body 21. Additional advancement of the handle 50 will apply sufficient pressure to the foodstuffs to cause the foodstuffs to be pressed out of the openings or perforations 24 in the perforated wall 23 of the body 21 in the form of juice, mash, etc.

FIGS. 2 and 6 show the piston 40 in its rearward most position and in its forward most position, respectively. The distance between the flat frontal surface 43 of the piston 40 while in the rear most position and the rear wall 48 of the piston 40 while in the forward most position can be considered the zone described as the loading chamber 31.

Figure 8:
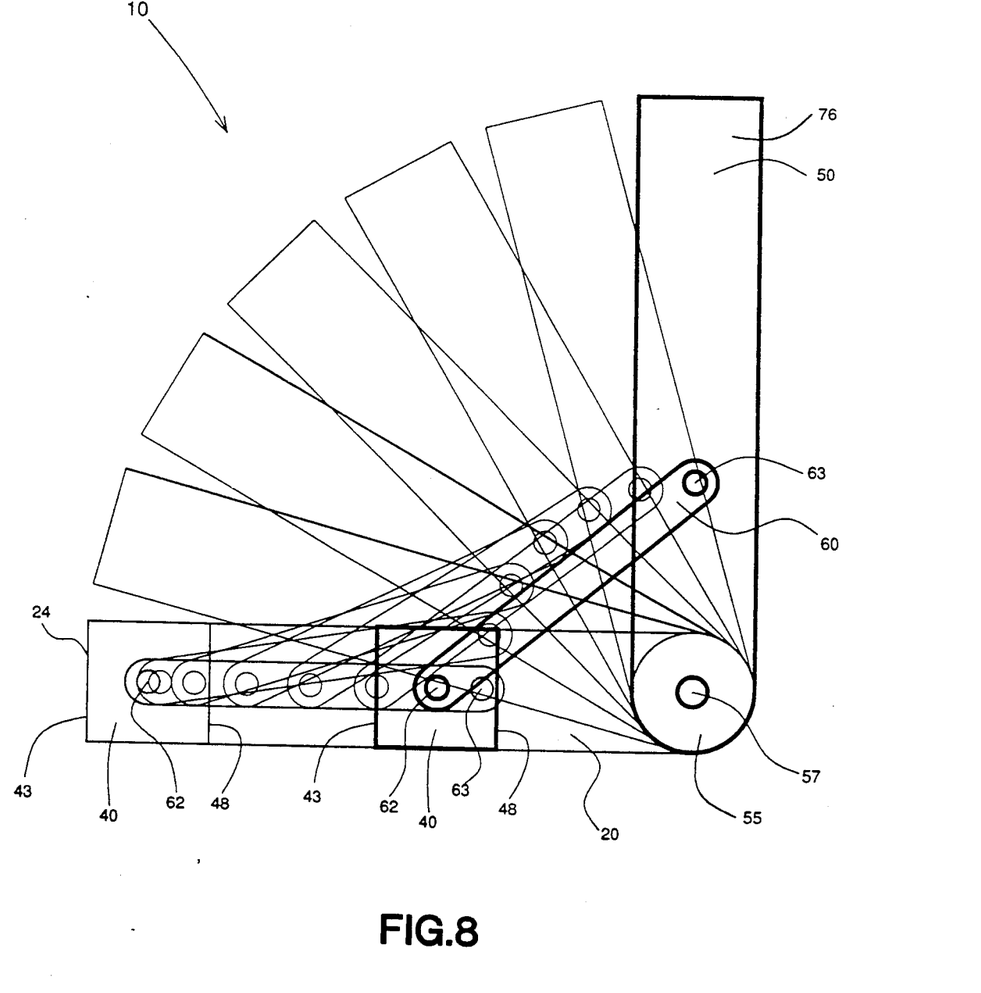
FIG. 8 is a composite side elevational view, partly in section, schematically illustrating the sequential operation of the press of FIG. 1.

In the illustrative embodiment, advancing the handle 50 through its arc of rotation in equal increments, causes the piston 40 to advance in its linear path in unequal and generally decreasing increments. FIG. 8 schematically shows the superimposition of six views of the press 10 in six sequential handle rotation steps of 15 degree increments, totaling 90 degrees of total rotation of handle 50. As the handle 50 is pivoted forward, connecting arm 60 is caused to advance, in turn, advancing piston 40 in a linear fashion inside the body 21. It can be seen, in FIG. 8, that the tabs 62 and 63 on the connecting arm 60 both move during operation; however, it can also be seen that tabs 63 on the connecting arm 60, which snap-fit into struts 58 on the handle 50, move in even arcuate increments, while the tabs 62 on the other end of connecting arm 60, which snap-fit into the struts 45 on the piston 40, move in uneven linear increments as does the attached piston 40.

For example, advancing the handle 50 in six equal 15 degree increments of 1.371 inches in arcuate distance causes the piston 40 to advance in 6 sequential and unequal linear increments of 0.501 inches, 0.548 inches, 0.524 inches, 0.429 inches, 0.280 inches and finally 0.097 inches respectively. Thus, there is a non-constant and generally progressive mechanical advantage of the travel of the piston 40 in relationship to the travel of the handle 50. The ratios of generally progressive mechanical advantages can be calculated as shown in the following chart:

Handle End Travel Divided By Piston Travel Equals Mechanical Advantage Ratio 1.371 Inches Divided by .501 Inches Equals 02.7 Mechanical Advantage Ratio
1.371 Inches Divided by .548 Inches Equals 02.5 Mechanical Advantage Ratio
1.371 Inches Divided by .524 Inches Equals 02.6 Mechanical Advantage Ratio
1.371 Inches Divided by .429 Inches Equals 03.2 Mechanical Advantage Ratio
1.371 Inches Divided by .280 Inches Equals 04.9 Mechanical Advantage Ratio
1.371 Inches Divided by .097 Inches Equals 14.1 Mechanical Advantage Ratio With a known frontal surface area of the piston 40 and a known amount of force being applied at the upper end of the handle 50, the resultant pounds per square inch (PSI) of pressure exerted within the crushing chamber 29 against the forward end 23 of the body 21 can be calculated. For example, the frontal surface area of a 1 inch diameter piston 40 is 0.780361 square inches. With 10 pounds of force exerted at the upper or free end 76 of the handle 50, then the mechanical advantage ratios concluded in the prior chart for each of the six steps translates into pounds per square inch (PSI) pressures between the piston 40 and the perforated end 23 in the body 21, as shown in the following chart:

Mechanical Advantage Ratio Divided By Piston Surface Multiplied By Force Equals PSI 02.7 Mechanical Advantage Divided by .780361 Multiplied by 10 Equals 034.6 PSI
02.5 Mechanical Advantage Divided by .780361 Multiplied by 10 Equals 032.0 PSI
02.6 Mechanical Advantage Divided by .780361 Multiplied by 10 Equals 033.3 PSI
03.2 Mechanical Advantage Divided by .780361 Multiplied by 10 Equals 041.0 PSI
04.9 Mechanical Advantage Divided by .780361 Multiplied by 10 Equals 062.8 PSI
14.1 Mechanical Advantage Divided by .780361 Multiplied by 10 Equals 180.7 PSI Since about the first half of the relatively short handle's arcuate travel is moving the front surface 43 of the piston 40 and advancing the loaded foodstuffs from the loading chamber 31 into the crushing chamber 29, the pounds per square inch in the range of the low 30's PSI is quite adequate. During approximately the last half of the handle's arcuate travel, the front surface 43 of the piston 40 has passed the opening 33 of the loading chamber 31 and is actually compressing the foodstuffs in the crushing chamber 29. This point is where the crushing process actually begins and is the same moment where a significant rise in the available pounds of pressure per square inch (PSI) will be needed. The prior chart shows the pressures of the piston 40 during this approximate last half of handle 50 movement to be from 41.0 PSI, in the beginning increment of movement, to 180.7 PSI, in the last and shortest increment of movement.

Thus, the press 10 of the present invention produces relatively high crushing pressures to thereby provide greater efficiencies while maintaining its convenience of use and storage by virtue of its compact configuration.

With the press of the present invention relatively high pressures are provided when needed while providing quick advancement and retraction of the piston 40 when desired.

As shown, relatively minimal or short linear movement of the piston 40 is provided to optimize pressure when crushing occurs in forcing foodstuffs through the perforations 24. In the present invention, equal incremental rotation of the advancing handle and corresponding arcuate distances result in a shorter and shorter advancement of the piston 40 thereby to provide the desired increased mechanical advantages and pressures as needed.

At the same time, the relationship of the rotation of the handle 50 and the linear movement of the piston 40 produce maximum linear movement of the piston 40 as needed. After inserting foodstuffs in the loading chamber 31, the free end 76 of the handle 50 is rotated in a counterclockwise arcuate manner. The initial stages of rotational movement of the handle 50 downwardly causes the maximum linear movement of the piston 40 to quickly advance the foodstuffs and piston 40 into the crushing chamber 29 for crushing. Then, after crushing the foodstuffs, the free end 76 of the handle 50 is rotated in a clockwise arcuate manner. The final stages of rotational movement of the handle 50 upwardly cause the maximum linear movement of the piston 40 to quickly retract the piston 40 past the loading chamber 31 to expedite the reloading of the press 10 for the next crushing operation.

For example, the first 45° of forward or downward rotation of the handle 50 advances the piston 40 twice as far as the last half of the crushing cycle. Correspondingly, the last 45° of rearward or upward rotation of the handle 50 retracts the piston 40 twice as far as the first half of the reloading cycle.

This represents additional efficiencies of the press of the present invention.

The press 10 preferably is hand holdable in use and readily can dispense pressed virgin foodstuffs from a variety of positions as needed into bowls, on food, etc.

At the same time, the press 10 can dispense foodstuffs while resting on a surface such as a kitchen counter top.

When the press 10 is held by hand during dispensing, one hand can hold the bottom of the base 20 and the other hand can rotate the handle 50.

Illustratively, the press 10 can be about 5.75 inches in length and have a breadth of about 1.25 inches. In this embodiment, the piston has a breadth and length of about 1.0 inches with a clearance of about 0.004 inches between its outer periphery and inner peripheral wall 32 of the body 21 to provide a sliding fit therebetween. This clearance generally is less in total area than the total area of any one perforation 24 in the front end 23 so that foodstuffs will move through any one perforation and not blow back about the periphery of the piston 40. Illustratively, there can be about 37 perforations in the end 23, each having a breadth of about 0.1 inches. Further, the loading chamber 31 and opening 33 can have a length of about 1.375 inches and the crushing chamber 29 can have a length of about 1.0 inches. Also, the arm 60 has a length of about 2.75 inches and is curved with a center-line radius of 3.3 inches. For ease of loading and holding increased amounts of foodstuffs for each loading, the angle between the retracted handle 50 and connecting arm 60 is about 50°. At this angle, the forward travel of the piston 40 is increased to provide a larger loading chamber 31.

The press 10 can be readily cleaned by submerging it in water and cycling the piston 40 several times. The resulting pumping action of water through the perforations 24 in the front end 23 by the reciprocating movement of the piston 40 alternates a pressure and vacuum pumping action which will flush any residue lodged in or directly behind the perforated end 23.

Within the scope of the present invention, moreover, the desired pressures can be achieved in a number of ways, including varying the surface area of the piston, the length of the handle (while maintaining convenient use and storage), the attachment point of the connecting arm to the handle and/or piston, the length of the connecting arm, the force applied to the handle, the attachment point of the handle to the body, the size and/or scale of component parts or in any combination of these or similar ways.

Although a preferred utility of the present invention is as a garlic press and its use has been highlighted for such use, the press of the present invention can be used for other pressable foodstuffs, such as vegetables, fruits, herbs, eggs, breads and pastas, and the like.

Thus, the invention in its broader aspects is not limited to the described embodiments and departures may be made therefrom within the scope of the accompanying claims without departing from the principles of the invention and without sacrificing its chief advantages.

What we claim is:

1. A food press, comprising:
   a member including perforations through which pressed foodstuffs can pass, and chamber means adjacent said perforations for receiving and pressing foodstuffs;
   a piston slidably fitted within said chamber means which linearly moves therein for moving and pressing foodstuffs, wherein foodstuffs can be received by said chamber means while said piston is in said chamber means and when said piston is in one position and wherein said piston is adapted to press foodstuffs within said chamber and through said perforations when said piston is in a second position within said chamber means;
   a rotatable handle operatively connected to said member; and
   linking means connected to said handle and to said piston, wherein when said handle is rotated in one direction said piston is moved to its one position within said chamber means and wherein when said handle is rotated in the other direction said piston is moved to its second position within said chamber means in generally decreasing increments to thereby increase available piston force and pressure as foodstuffs are to be pressed through said perforations.

2. The food press of claim 1, wherein said chamber means has a potion contiguous with said perforations which is closed about its periphery for directing the foodstuffs only through said perforations during pressing.

3. The food press of claim 2, wherein said member has an opening therein adjacent said closed portion for receiving foodstuffs to be pressed.

4. The food press of claim 3, wherein said piston is adapted to remain in said chamber means while foodstuffs are placed in said member through said opening.

5. A food press, comprising:
   an elongated body including a forward end having perforations through which pressed foodstuffs can pass, and chamber means for receiving and pressing foodstuffs comprising a crushing chamber at said forward end, and a loading chamber adjacent said crushing chamber having an opening therein for receiving foodstuffs;
   a piston slidably fitted within said chamber means which reciprocates therein for moving and pressing foodstuffs, wherein said piston is adapted to be positioned in said chamber means rearwardly of the foodstuffs in said loading chamber in its retracted position during and after foodstuffs are fed into the press and in said crushing chamber and against said forward end for pressing the foodstuffs through said perforations in its forward position;
   a rotatable handle pivotally connected to said member rearwardly of said piston; and
   linking means connected to said handle and to said piston, wherein said piston is adapted to move to its retracted position in said chamber means to allow said member to receive foodstuffs in said loading chamber when said handle is rotated in one direction and wherein said piston is adapted to be moved to its forward position in said crushing chamber for pressing foodstuffs through said perforations when said handle is rotated in the other direction.

6. The food press of claim 5, wherein said handle rotates in an arc of about 90°, and wherein said handle is in its open position when said piston is in its retracted position in chamber means and its closed position when said piston is in its forward position in said chamber means.

7. The food press of claim 6, wherein said handle in the open position is substantially perpendicular to said body and wherein said handle in its closed position substantially overlies said body.

8. A food press, comprising:
   an elongated body including a forward end having perforations therethrough, a rear end, and chamber means therebetween, wherein said chamber means includes a crushing chamber contiguous with said forward end for pressing foodstuffs through said perforations, a loading chamber contiguous with said crushing chamber having an opening therein for receiving foodstuffs, and a piston chamber contiguous with said loading chamber for receiving a piston;

a piston slidably fitted within said elongated body which linearly reciprocates therein adapted to be positioned in said piston chamber in its retracted position and adapted to press against said perforated forward end in its forward position;

a handle rotatably connected to said rear end of said elongated body adapted to rotate relative to said elongated body from an open position extending above and at an angle to said body to a closed position substantially parallel to said body; and a link connected to said handle and to said piston, wherein said handle is in its open position said piston is in said piston chamber and wherein as said handle is rotated to its closed position in equal increments, said piston slides through said loading chamber and into said pressing chamber in unequal and generally decreasing increments to provide generally increasing force and pressure on said piston as it pushes foodstuffs from said loading chamber and into said crushing chamber and presses foodstuffs against said front end and through said perforations.

9. The food press of claim 8, wherein the clearance between said piston and body is less than the area comprising a perforation so that foodstuffs will be pressed through said perforations and not move rearwardly about said piston.

10. The food press of claim 9, wherein said body and piston have a cylindrical cross-sectional shape.

11. The food press of claim 8, wherein said handle rotates in an arc of about 90°, and wherein said handle is in its open position when said piston is in said piston chamber, and wherein said handle is in its closed position when said piston is in said crushing chamber at said forward end.

12. The food press of claim 11, wherein said handle is substantially perpendicular to said body in its open position, and wherein said handle is substantially parallel to and overlying said body in its closed position.

13. The food press of claim 12, wherein said body and the inner portion of said handle have complementary configurations so that said handle can rest on said body in its closed position.

14. The food press of claim 8, wherein said piston has a forward end for contacting, pushing and crushing foodstuffs and a rear end, wherein said handle has a lower end pivotally connected to said body and an upper free end for applying pressure to said handling in the closing thereof and for gripping said upper free end of said handling in the opening thereof.

15. The food press of claim 14, wherein said linking means comprises an arm pivotally connected to said handle intermediate its ends and to said rear end of said piston.

16. The food press of claim 15, wherein said body has a slot therein adjacent to and rearward of said opening for receiving said arm, and wherein said arm has a curvilinear convex configuration to facilitate entry into and positioning within said body as said handle moves to its closed position.

17. The food press of claim 8, wherein said body has a longitudinal axis, wherein said handle has a lower end pivotally connected to said rear end of said body essentially on its longitudinal axis and an upper free end upon which pressure can be applied to move said handle in equal increments from its open position to its closed position and thereby cause said piston to move in unequal and generally decreasing increments to provide crushing pressure upon foodstuffs substantially greater than the pressure being applied to said handle.

18. The food press of claim 17, wherein the relative movement between said handle and piston provide a progressively increasing mechanical advantage.

19. The food press of claim 18, wherein the pressure applied by said piston during crushing of the foodstuffs is from about 2 to 14 times the pressure applied to said free end of said handle during crushing.

20. The food press of claim 17, wherein the initial equal increments of closing movement of said handle causes said linked piston to move greater linear distances than in the final increments of said handle closing movement to quickly move said piston and foodstuffs into said crushing chamber, and correspondingly the final equal increments of the opening movement of said handle causes said linked piston to move greater linear distances than in the initial increments of said handle opening movement to quickly uncover said opening in said body to allow the reloading of foodstuffs.

21. The food presses of claims 1, 5 or 8, wherein said presses are hand holdable for pressing and dispensing of foodstuffs.

22. The food press of claim 20, wherein said press can dispense foodstuffs in a variety of positions.

23. The food press of claim 21, wherein said press dispenses crushed garlic cloves.

24. The food press of claim 1, 5 or 8, wherein said press is cleanable by closing and opening said handle while the press is in a cleaning liquid so that the reciprocating movement of said piston produces a pumping action of the liquid through said perforations.

* * * * *